(No Model.) 2 Sheets—Sheet 2.
W. A. LAIDLAW.
BALING PRESS.
No. 473,320. Patented Apr. 19, 1892.
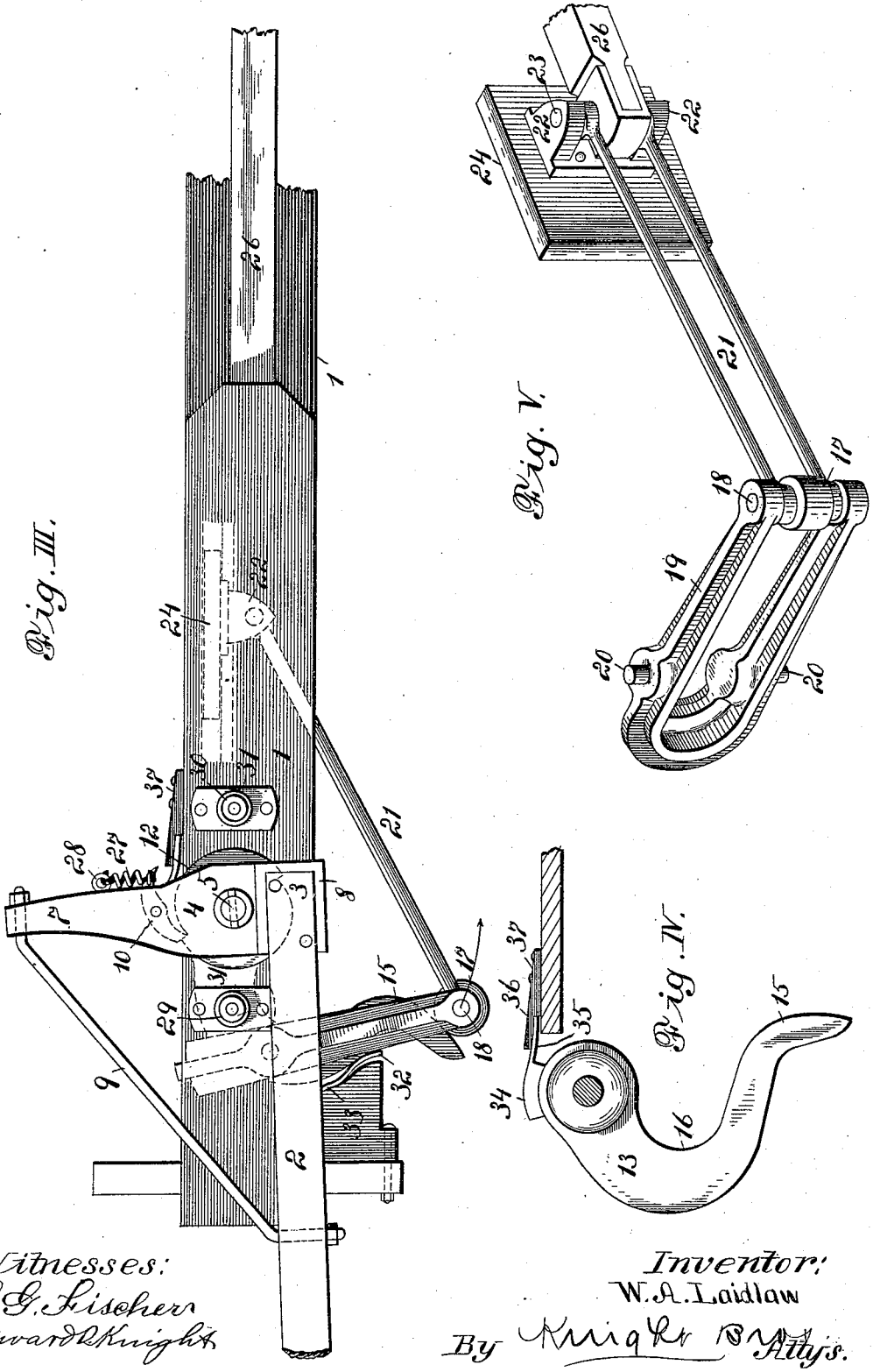
Witnesses:
F. G. Fischer
Edward Knight
Inventor:
W. A. Laidlaw
By Knight Bros. Atty's.

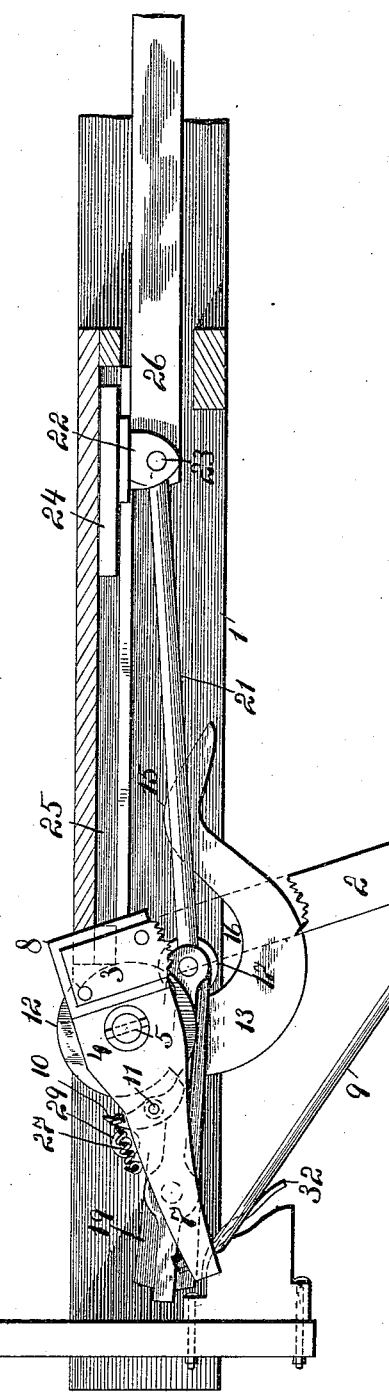

UNITED STATES PATENT OFFICE.

WILLIAM A. LAIDLAW, OF CHEROKEE, KANSAS.

BALING-PRESS.

SPECIFICATION forming part of Letters Patent No. 473,320, dated April 19, 1892.

Application filed June 1, 1891. Serial No. 394,731. (No model.)

*To all whom it may concern:*

Be it known that I, WILLIAM A. LAIDLAW, of Cherokee, in the county of Crawford and State of Kansas, have invented certain new and useful Improvements in Baling-Presses, of which the following is a full, clear, and exact description, reference being had to the accompanying drawings, which form a part of this specification.

My invention relates to certain new and useful improvements in the operation of baling-presses; and it consists in features of novelty hereinafter described, and pointed out in the claims.

Figure I is a plan view of my improved power. Fig. II is a side elevation of the same. Fig. III is a plan view showing the position of the parts as a charge is about to be pressed. Fig. IV is an enlarged detail section showing my improved trip-lever and brake in connection therewith. Fig. V is an enlarged detail perspective showing a pivoted yoke and connecting-rods for connecting the same with the pitman and slide to which the pitman and rods are pivoted.

Referring to the drawings, 1 represents the frame by which the various parts of my power are supported.

2 represents the sweep connected at its inner end, as shown at 3, to one end of an arm 4, said arm 4 being loosely mounted on the upper end of a vertical shaft 5, said shaft being journaled in the frame 1, as shown at 6, having suitable bearings for supporting the same. The arm 4 extends in each direction from its pivotal point, the extension 7 being of greater length than the extension 8, to which the inner end of the sweep is attached. The outer end of the portion 7 of the arm 4 is connected with the sweep 2 by a brace-rod 9.

10 represents a pawl pivoted to the under side of the arm 4, as shown at 11. Said pawl in traveling around the power-shaft 5 engages at intervals with the ratchet-wheel 12, said ratchet-wheel having teeth 13ª for that purpose. The ratchet-wheel 12 is secured rigidly to the shaft 5, so that as said ratchet-wheel is turned the shaft 5 will be turned with it.

13 represents a trip-lever secured rigidly to the shaft 5, as shown at 14, said trip-lever having a convex face 15 and a concave face 16. As the shaft 5 is revolved, the trip-lever 13, being secured rigidly to the same, is revolved with it, and in its passage its outer end or convex surface 15 comes in contact with the roller 17, loosely mounted on a shaft 18, said shaft 18 being supported by a yoke 19, said yoke being pivoted to the frame 1, as shown at 20, so as to admit of the free oscillation of the same.

21 represents connecting-rods pivoted at one of their ends to the outer end of the yoke 19 on the shaft 18, the opposite ends of said connecting-rods being pivoted to a bracket 22, as shown at 23, said bracket being secured to a slide 24, which reciprocates or is guided in the grooves 25, located in the frame 1.

26 represents the outer end of the pitman, which is pivoted to the bracket 22 in like manner with the connecting-rods 21, the opposite end of the pitman of course being connected with the follower of the press. (Not here shown.)

27 represents a spring connecting the outer end of the pawl 10 with a ring 28 on the arm 4, the purpose of said spring being to hold the opposite end of the pawl 10 in engagement with the ratchet-wheel 12.

29 30 represent rollers secured to the frame 1, as shown at 31, the purpose of said rollers being described later on.

32 represents a spring secured to the frame 1, as shown at 33.

34 represents a brake having a spring-shank 35, by which it is secured to a bracket 36, said bracket 36 being in turn secured to the frame 1, as shown at 37, said brake at all times being in engagement with the inner end of the trip-lever 13.

In operation the trip-lever 13 and other parts of my device are in the position shown in Fig. III when commencing to press a charge of material in the baling-chamber, the outer convex portion 15 of the trip-lever pressing against the roller 17. As the sweep is moved forward or in the direction shown by arrows, Fig. III, the pawl 10 comes in contact with the ratchet-wheel 12, revolving the same, and with it the vertical power-shaft 5 and trip-lever 13, the trip-lever 13 having its outer end made in convex form, so as to gain speed in commencing to press the charge, at which point very little power is necessary. As the sweep advances the trip-lever advances into the position shown in Fig. I, the trip-lever gradually moving forward in its relative position with the roller 17, and at the same time moving the same forward, together with the connecting-rods 21, slide 24, and pitman 26. As the trip-lever moves forward the concave portion 16 of the trip-lever 13 comes in contact with the roller 17, thus gaining power, as the speed is decreased as the charge in the baling-chamber is being pressed, the greatest amount of power being exerted near the latter portion of the pressing operation.

When the various portions have assumed the position shown in Fig. I and the charge in the baling-press is sufficiently pressed, the outer end of the pawl 10 comes in contact with one of the rollers 29 30, thus raising said pawl out of engagement with the ratchet 12 and permitting the ratchet-wheel, shaft 5, and trip-lever 13 to fly backward from the position shown in Fig. I to the position shown in Fig. III, the expansion of the hay in the baling-chamber throwing them into said position, after which the operation is repeated, two charges being pressed on each revolution of the sweep 2.

The spring 32 is to prevent the trip-lever 13 from coming back with too much force against the frame after the ratchet-wheel has been released by the pawl, and as a further means to prevent jar in the backward travel of the trip-lever I provide a brake 34, which bears against the inner end of the lever and thus ease the shock.

I claim as my invention—

1. In a baling-press, the combination of a supporting-frame, a power-shaft journaled therein, a movable member journaled on said power-shaft, a pawl secured to said member, a ratchet-wheel secured to said power-shaft, a trip-lever on said power-shaft, and means in connection with said trip-lever, whereby a pitman is operated, substantially as set forth.

2. In a baling-press, the combination of a suitable supporting-frame, a power-shaft journaled thereto, a movable member mounted on said power-shaft, a pawl pivoted to said movable member, a ratchet-wheel secured to said power-shaft, a trip-lever secured to said power-shaft, a yoke pivoted to the supporting-frame, a bearing-point on said yoke with which the trip-lever engages, a pitman, and rods for connecting said pitman with said yoke, substantially as described, and for the purpose set forth.

3. In a baling-press, the combination of a suitable supporting-frame, a power-shaft journaled thereto, a movable member journaled on said power-shaft, a pawl pivoted to said member, a spring connecting said pawl with said movable member, a ratchet-wheel on said power-shaft, a trip-lever on said power-shaft, and means in connection with said trip-lever for working a pitman, substantially as and for the purpose set forth.

4. In a baling-press, the combination of a supporting-frame, a power-shaft journaled therein, a movable member on said power-shaft, a pawl pivoted to said movable member, a ratchet-wheel on said power-shaft, and a roller located in the path of said pawl for throwing the same out of engagement with said ratchet-wheel, substantially as and for the purpose set forth.

5. The combination of a suitable supporting-frame, a power-shaft journaled therein, an arm journaled on said shaft, a sweep secured to said arm, a pawl pivoted to said arm, a ratchet-wheel secured to said power-shaft, means for throwing said pawl out of engagement with said ratchet-wheel, a trip-lever secured to said power-shaft, a yoke pivoted to said supporting-frame, a roller journaled at the outer end of said yoke, a pitman, a slide, and rods for connecting said pitman and slide with the outer end of said yoke, substantially as described, and for the purpose set forth.

6. The combination of a supporting-frame, a power-shaft, an arm pivoted thereto, a sweep secured to said arm, a pawl pivoted to said arm, a ratchet-wheel secured to said power-shaft, means for disengaging said pawl from said ratchet-wheel, and a trip-lever 13 for operating a pitman, substantially as and for the purpose set forth.

7. The combination of a supporting-frame, shaft journaled therein, a frame 4, pivoted on said shaft, a sweep 2, connected to said frame, a pawl pivoted to said frame 4, a ratchet-wheel secured to said power-shaft, a trip-lever on the power-shaft, and a spring 32 for easing the rebound of said trip-lever, substantially as and for the purpose set forth.

WILLIAM A. LAIDLAW.

Witnesses:
E. A. PERRY,
R. N. KEMP.